United States Patent [19]

Caldwell et al.

[11] 4,331,338
[45] May 25, 1982

[54] DUCT SEAL ASSEMBLY

[75] Inventors: Jack H. Caldwell, Kent; Peter Llewellyn, Bellevue, both of Wash.

[73] Assignee: The Boeing Company, Seattle, Wash.

[21] Appl. No.: 219,425

[22] Filed: Dec. 23, 1980

[51] Int. Cl.³ .................... F16J 15/12; F16J 15/32
[52] U.S. Cl. .................................... 277/58; 277/60; 277/174; 277/177; 277/184
[58] Field of Search ............... 277/58, 60, 83, 84, 277/151, 173-178, 181-186, DIG. 4

[56] References Cited

U.S. PATENT DOCUMENTS

| | | | |
|---|---|---|---|
| 1,811,588 | 6/1931 | Moreau | 277/173 |
| 2,105,871 | 1/1938 | Vigne | 277/174 |
| 2,114,662 | 4/1938 | Barrows | 277/174 |
| 2,151,410 | 3/1939 | Richter | 277/175 |
| 2,289,164 | 7/1942 | Arnold et al. | 174/151 |
| 2,414,509 | 1/1947 | Crot | 248/56 |
| 2,535,288 | 12/1950 | Honkanen | 277/174 |
| 2,714,023 | 7/1955 | Hennessy | 277/175 |
| 2,840,396 | 6/1958 | Hennessy | 277/173 |
| 2,894,769 | 7/1959 | Richmond et al. | 277/83 X |
| 2,960,355 | 11/1960 | Bayerl | 277/173 |
| 3,094,335 | 6/1963 | Shenk | 174/151 |
| 3,101,387 | 8/1963 | Mihran | 174/151 |
| 3,226,467 | 12/1965 | Kienel et al. | 174/151 |
| 3,402,573 | 9/1968 | Eide | 277/174 |
| 3,572,733 | 3/1971 | Howald et al. | 277/173 |
| 3,642,289 | 2/1972 | Basham et al. | 277/58 X |
| 3,972,536 | 8/1976 | Warner et al. | 277/83 |
| 4,019,749 | 4/1977 | Dawson et al. | 277/58 |
| 4,107,456 | 8/1978 | Schuster et al. | 248/56 |
| 4,239,240 | 12/1980 | Wilkinson | 277/84 |

FOREIGN PATENT DOCUMENTS 946373  1/1964  United Kingdom ............... 277/58

Primary Examiner—Robert S. Ward, Jr.
Attorney, Agent, or Firm—Christensen, O'Connor, Johnson & Kindness

[57] ABSTRACT

A flexible, fluid-tight seal assembly for sealing the gap between a duct and a wall where the duct passes through an opening in the wall. The seal assembly includes an annular housing affixed to and centered on the opening in the wall. The housing includes a circular recess opening inwardly toward the duct. Contained in the recess is a carrier ring supporting a set of three O-rings set into cooperable O-ring grooves in the carrier ring. One O-ring groove opens inwardly toward the duct such that the associated O-ring snugly encircles the duct so as to provide a seal between the duct and the carrier ring. The other two O-rings are set into grooves which face in opposite directions such that the two O-rings snugly abut the walls of the recess to provide a seal between the carrier ring and the housing. The carrier ring is movable laterally in the recess of the housing so as to permit lateral movement of the duct with respect to the wall. Also, the O-ring sealed between the carrier ring and the duct permits the duct to undergo axial motion with respect to the carrier ring and the wall. Together, the three O-rings also permit the duct to undergo limited rotational motion about axes of rotation lying in the plane of the wall opening and extending transversely with respect to the duct. The seal assembly provides an effective gas- and liquid-tight seal between the duct and the wall and may be particularly adapted to accommodate a hot air duct in an airplane.

15 Claims, 4 Drawing Figures

DUCT SEAL ASSEMBLY

BACKGROUND OF THE INVENTION

The present invention relates generally to dust and vapor seals and, more particularly, to a flexible seal for a duct passing through a wall.

The present invention was developed to meet a need in the aircraft industry for an effective seal assembly for sealing the gap around a hot air duct where the duct passes through a wall, such as a bulkhead or firewall.

More particularly, large commercial transport airplanes typically include an air duct network through which hot air, known as bleed air, is conducted from the airplane engines to various other parts of the airplane. The bleed air is drawn from the compressor stages of the turbine engines and conducted through the duct network at temperatures of up to 957° F. and pressures of up to 312 psi. The pressurized bleed air is used for cabin pressurization and wing and inlet anti-icing.

The bleed air is distributed to the various parts of the airplane through steel ducts approximately five inches in diameter. The ducts pass through an engine firewall as well as various bulkheads and similar wall members. At each point where the duct passes through a wall there is a need for a seal assembly that provides a tight seal between the wall and the duct and yet permits the duct to undergo some movement relative to the wall in response to normal structural flexing of the airplane and thermal expansion and contraction of the duct. There is also a need for a seal that will accommodate misalignment of the duct with respect to the seal bulkhead location due to manufacturing tolerance accumulation. Where the duct passes through walls separating pressurized from unpressurized cabin spaces it is further desirable that the seal be capable of containing moderate positive pressure on the order of fifteen pounds per square inch. Additionally, at the point where the duct passes through the engine firewall there is a need for a seal assembly that provides a barrier against penetration of liquid fuel as well as fuel vapors, and which also allows the duct to undergo axial, lateral, and bending motions relative to the wall.

Accordingly, it is the primary object and purpose of the present invention to provide a seal assembly for a duct passing through a wall. More specifically, it is the object and purpose of the present invention to provide such a seal assembly that allows the duct to move relative to the wall and yet which also provides a fluid-tight barrier between the duct and the wall.

It is another object of the present invention to provide a seal assembly that obtains the foregoing objects and purposes and which is particularly adapted to accommodate a hot bleed air duct in an airplane.

It is another more specific object of the invention to provide a seal assembly for an air duct passing through an opening in a wall member wherein the duct is free to undergo relative axial motion through the opening, as well as relative lateral motion within the opening and angular or rotational motion about the opening.

It is also an object of the invention to obtain the foregoing objects with a seal assembly that occupies a minimum of space, which is readily serviceable and which permits ready installation and removal of the duct without necessitating removal of the seal assembly.

SUMMARY OF THE INVENTION

In accordance with the present invention, a seal assembly for a duct passing through an opening in a wall includes a generally annular seal assembly housing affixed to the wall about the opening so as to provide a generally circular passage for the duct. The housing includes an internal annular recess opening radially inwardly toward the circular duct passage. Contained in the recess of the housing is a carrier ring supporting at least two elastomeric O-rings. The O-rings are supported in cooperable O-ring grooves formed in the carrier ring. A first O-ring and its associated O-ring groove are oriented such that the groove and the exposed portion of the O-ring face radially inwardly. The carrier ring is sized such that the first O-ring snugly encircles the duct to provide a seal between the duct and the carrier ring. The second O-ring and its associated O-ring groove are oriented such that the exposed portion of the O-ring faces and abuts an interior side wall of the recess in the seal assembly housing. The recess of the seal assembly housing and the carrier ring are cooperably sized in their axial dimensions such that the second O-ring is maintained firmly engaged against the wall of the housing to thereby provide a seal between the carrier ring and the housing. The recess in the housing is sized in radial dimension to allow the carrier ring, and thereby also the duct, to undergo a limited amount of lateral movement within the opening through the housing and the wall. The first O-ring permits relative axial motion of the duct. Together, the two O-rings and the carrier ring provide a fluid-tight seal between the wall and the duct and yet permit the duct to move both axially and laterally with respect to the wall. Additionally, the seal assembly accommodates a limited amount of rotational motion of the duct with respect to the wall.

Preferably, the carrier ring supports three O-rings, with one O-ring encircling the duct as above and the other two O-rings and their associated grooves being oriented to face in opposite directions so as to abut the opposing parallel side walls of the recess in the seal assembly housing. This configuration forms a double O-ring seal between the carrier ring and the housing to provide a more reliable and vapor-impermeable seal. Also, the double O-ring seal eliminates metal-to-metal contact between the carrier ring and the housing and thereby better accommodates lateral motion of the duct and carrier ring within the housing.

In another aspect of the invention, the first O-ring, which provides the seal between the carrier ring and the duct, is provided with flattened sides and is sized to fit snugly in a cooperably formed O-ring groove such that rotation of the O-ring due to axial motion of the duct is prevented. Additionally, the first O-ring is preferably formed of a glass fiber reinforced silicone rubber to prevent abrasion due to axial motion of the duct. As a result of these features, the carrier ring and the first O-ring are better able to accommodate sustained axial movement and the vibration of the duct.

The seal assembly may be particularly adapted for a duct carrying hot gases by providing a tubular spacer element between the duct and the carrier ring. In this embodiment, the spacer element functions to thermally insulate the duct from the carrier ring and the first O-ring so as to prevent thermal deterioration of the first O-ring.

DETAILED DESCRIPTION OF THE PREFERRED EMBODIMENT

Figure 1:
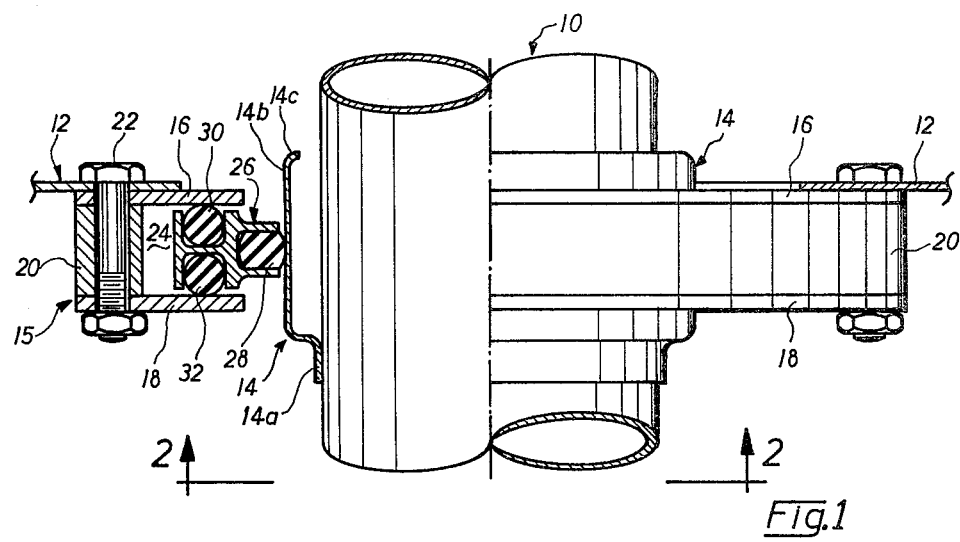
FIG. 1 is a side view in partial cross section of the preferred embodiment of the seal assembly of the present invention as it is employed to seal the gap where a hot bleed air duct passes through a compartment wall of an airplane.
Figure 2:
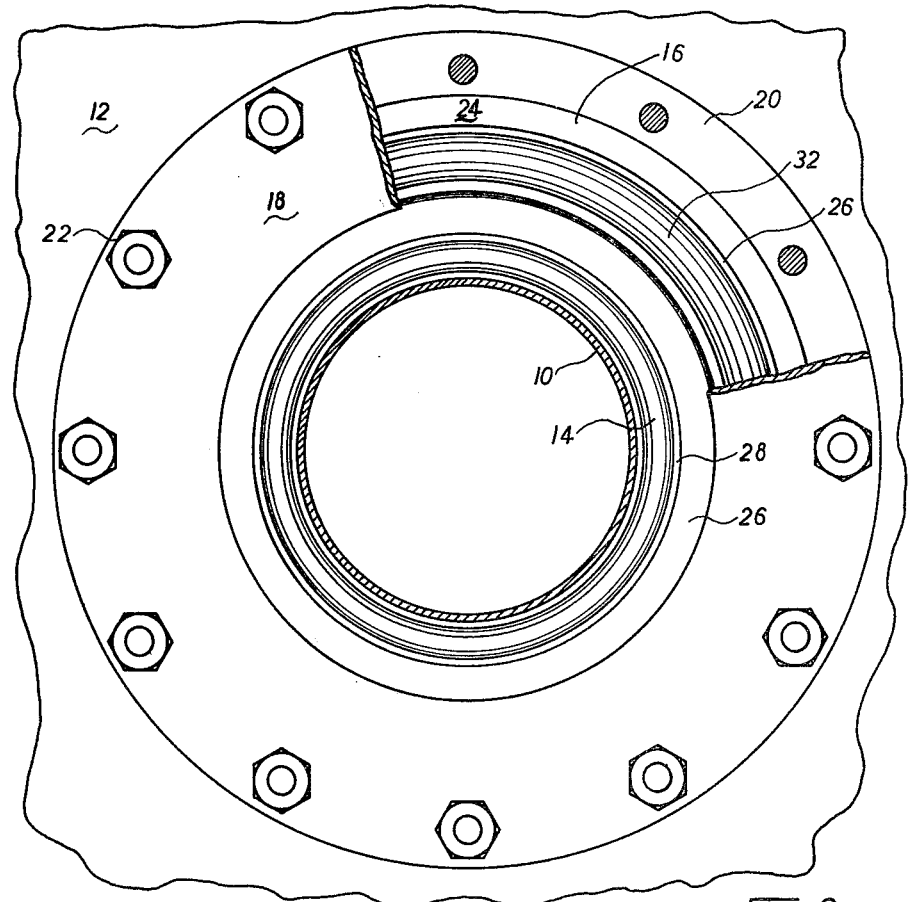
FIG. 2 is a bottom view in partial cross section of the seal assembly of FIG. 1, taken along section line 2—2 of FIG. 1.

Referring to FIGS. 1 and 2, the preferred embodiment of the seal assembly of the present invention is illustrated as it is employed to provide a flexible, fluid-tight seal between a bleed air duct 10 and a compartment wall 12 through which the duct 10 passes.

The bleed air duct 10 has a diameter on the order of five inches and is typically formed of a high-temperature stainless steel to accommodate bleed air at temperatures of 600° to 1000° F. Affixed to the bleed air duct 10 at the point where it passes through an opening in the wall 12 is a spacer element 14. The spacer element 14 is generally tubular in configuration and is likewise constructed of a high-temperature stainless steel. The spacer element 14 is stepped in diameter to include a tubular portion 14a sized to snugly encircle the duct 10 and a coaxial, relatively larger diameter tubular portion 14b spaced radially from the duct 10 to thermally insulate the normally hot duct from the adjacent seal assembly. The small diameter tubular portion 14a of the spacer element 14 is affixed and sealed to the external surface of the duct 10 by spot or seam welding around its circumference. The spacer element 14 further includes an inwardly curved radius flange 14c at the end of the large diameter portion 14b to facilitate insertion of the assembled duct and spacer element into the seal assembly, as described in greater detail below.

The seal assembly includes an annular housing 15 formed of first and second annular discs 16 and 18, respectively, and a tubular spacer 20. The discs 16 and 18 are positioned coaxially with respect to one another and are spaced apart by the spacer 20. A set of twelve bolts 22 pass through cooperably aligned holes in the discs 16 and 18 and through bores in the spacer 20 to affix the discs 16 and 18 to the ends of the spacer 20. The bolts 22 also affix the entire seal assembly housing 15 to the compartment wall 12 about the opening in the wall 12. The disc 16 lies flush against the wall 12 to effectively form a seal between the housing 15 and the wall 12. Together, the discs 16 and 18 and the spacer 20 form an inwardly opening annular recess 24 having substantially parallel, planar side walls.

A carrier ring 26 supporting three O-rings 28, 30, and 32 is located in the recess 24 of the housing 15 where it effectively forms a seal between the spacer element 14 of the duct 10 and the housing 15. More specifically, the O-rings 28, 30, and 32 are supported in cooperable O-ring grooves formed in the carrier ring 26. The O-ring grooves supporting O-rings 30 and 32 open in opposite axial directions from the carrier ring 26 such that the O-rings 30 and 32 face and abut the parallel interior facing surfaces of the discs 16 and 18, respectively. The O-rings 30 and 32 thus form a double seal that effectively prevents gas or liquid from passing through the compartment wall 12 by passing around the carrier ring 26 and through the recess 24 of the housing 15. Further, the O-rings 30 and 32, being oriented to face in opposite axial directions with respect to the axis of the duct 10, permit the duct 10 and carrier ring 26 to undergo lateral, or radial movement with respect to the opening in the compartment wall 12. In this regard, the inside diameter of the tubular space 20 of the seal assembly housing 15 is somewhat larger than the outside diameter of the carrier ring 26 to permit the carrier ring 26 to undergo limited radial motion within the housing 15. Also, the inside diameters of the discs 16 and 18 of the housing 15 are correspondingly larger than the outside diameter of the large diameter portion 14b of the spacer element 14 on the duct 10 so as to accommodate such lateral motion of the duct.

The O-ring groove supporting the O-ring 28 opens radially inwardly toward the duct 10. The O-ring 28 abuts and encircles the large diameter portion 14b of the spacer element 14 so as to provide a gas- and liquid-tight seal between the carrier 26 and the spacer element 14. The O-ring 28 maintains this seal and yet also accommodates axial and limited angular movement of the duct 10 with respect to the opening in the compartment wall 12.

It will be noted that the lateral dimension, or depth, of the recess 24, that is, the difference between the inside diameter of the tubular spacer 20 and the inside diameters of the like-sized discs 16 and 18, is somewhat less than the lateral dimension, or width, of the carrier ring 26. This ensures that, during substantial lateral motion of the duct 10, the carrier ring 26 abuts the spacer 20 to thereby limit the lateral displacement of the carrier ring 26 and prevent the spacer element 14 from abutting the inner peripheries of the discs 16 and 18. This effectively prevents metal-to-metal contact between the spacer element 14 and the housing 15 during vigorous vibration or flexing of the duct 10.

The O-rings 30 and 32 may be conventional silicone rubber O-rings. The O-ring 28, on the other hand, is preferably formed of glass fiber reinforced silicone rubber to provide increased resistance to abrasion due to axial motion of the duct 10. Also, the O-ring 28 is preferably flattened on opposite sides along planes lying generally parallel to the plane of the O-ring. The O-ring 28 is sized such that the flattened sides of the O-ring 28 fit snugly between parallel side walls of its associated O-ring groove so as to prevent rotation of the O-ring 28 during axial motion of the duct 10. Such an O-ring is commercially available under the trade name Peri-Seal from General Connectors Company of Burbank, California.

The seal assembly is assembled by first locating the disc 16 against the opening in the compartment wall 12. The spacer 20 and disc 18 are then fastened to the disc 16, with the carrier ring 26 and its associated O-rings contained in the recess 24 as the housing 15 is assembled. The duct 10 may then be simply inserted through the carrier ring 26 until the spacer element 14 on the duct 10 is snugly engaged by the carrier ring 26 and the O-ring 28.

The seal assembly forms a gas-tight seal that is capable, in ordinary usage, of containing a positive gas pressure of as much as 50 psi. For this reason, the seal assembly is particularly useful in aircraft applications where a duct passes through compartment walls separating pressurized cabin areas from unpressurized cabin areas. Also, because the seal assembly provides a liquid-tight seal, it is useful for application in an engine firewall, particularly in an airplane, where it is essential to prevent the possibility of spilled or leaked fuel from passing either in liquid form or as a vapor through the firewall.

Figure 3:
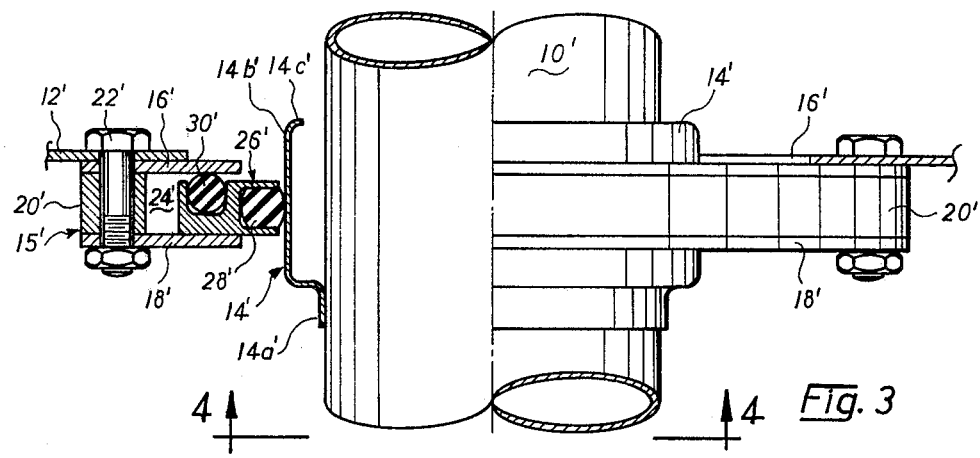
FIG. 3 is a side view in partial cross section of an alternative embodiment of the seal assembly of the present invention.
Figure 4:
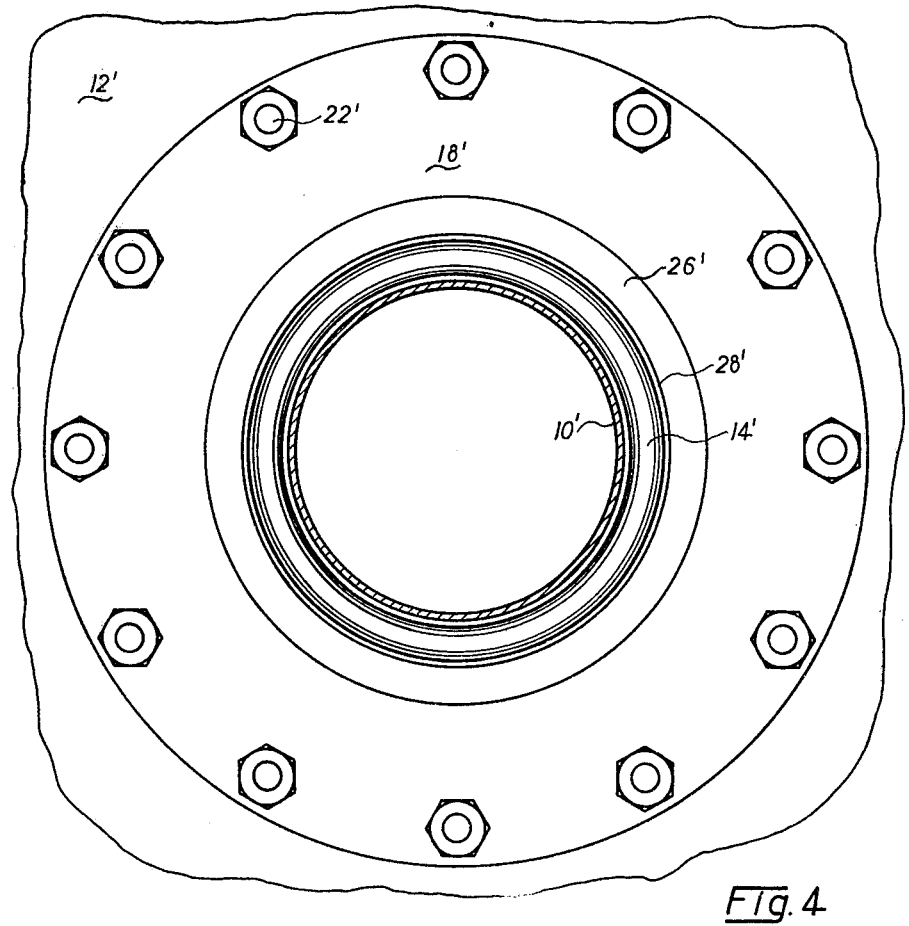
FIG. 4 is a bottom view in partial cross section of the alternative seal assembly of FIG. 3, taken along line 4—4 of FIG. 3.

An alternative embodiment of the invention is illustrated in FIGS. 3 and 4, wherein elements functionally equivalent to those of FIGS. 1 and 2 are identified by primed reference numerals. The essential difference between the embodiment illustrated in FIGS. 3 and 4 and the preferred embodiment illustrated in FIGS. 1 and 2 is that the alternative embodiment utilizes only two O-rings, 30' and 28'. It will be recalled that the O-rings 30 and 32 of the preferred embodiment form a double seal against leaking of liquid or vapor through the compartment wall by passing around the carrier ring 26 through the recess 24. As this function can largely be obtained with a single O-ring, 30' in FIG. 3, it is possible in certain applications to obtain adequate sealing performance with the alternative embodiment illustrated in FIGS. 3 and 4. The advantages of the alternative embodiment are that it is simpler and the seal assembly housing 15' can be formed with a slightly smaller axial dimension. The embodiment illustrated in FIGS. 1 and 2, is however, the preferred embodiment where such space limitations are not critical, since there is not the metal-to-metal contact that exists in the alternative embodiment between the carrier ring 26' and the disc 18' of the seal assembly housing 15.

Although the present invention is described and illustrated herein by reference to a preferred embodiment and an alternative embodiment, it will be understood that various alterations, substitutions and modifications that may be apparent to one of ordinary skill in the art may be made without departing from the essential spirit of the invention. Accordingly, the scope of the invention is defined solely by the following claims.

The embodiments of the invention in which an exclusive property or privilege is claimed are defined as follows:

1. A seal assembly for forming a fluid-tight seal between a duct and a wall where the duct passes through an opening in the wall sufficiently large to permit the duct to move laterally within the opening, comprising:
    an annular housing affixed to said wall about said opening in said wall so as to form a passage through which said duct passes, said passage being sufficiently large to allow said duct to undergo lateral movement within said passage relative to said wall, said housing including means forming a circumferential internal recess that opens radially inwardly toward said duct and which includes mutually opposing, substantially parallel interior sidewalls extending generally parallel to the plane of said wall; and
    a substantially circular carrier ring engaged in said recess of said housing, said carrier ring having a first circumferential O-ring groove opening radially inwardly and supporting a first elastomeric O-ring snugly received in said first groove, said carrier ring and said first O-ring being sized such that said first O-ring snugly encloses in sealing relationship an exterior surface of a duct passing through said opening in said wall, said carrier ring further including at least one circumferential O-ring groove opening radially with respect to the axis of said carrier ring and supporting an elastomeric O-ring sized to snugly abut an interior facing sidewall of said recess to provide a seal between said carrier ring and said housing, said recess of said housing being sized larger in diameter than the diameter of said carrier ring so as to provide radial clearance for relative lateral motion of said duct and said carrier ring with respect to said housing.

2. The seal assembly defined in claim 1 wherein said carrier ring includes second and third circumferential O-ring grooves each opening in opposite directions axially with respect to the axis of said carrier ring, said second and third O-ring grooves of said carrier supporting second and third elastomeric O-rings engaged in sealing relationship respectively against the opposing sidewalls of said recess.

3. The seal assembly defined in claim 1 wherein said carrier ring includes a second circumferential O-ring groove opening axially with respect to the axis of said carrier ring, said second O-ring grooves supporting an O-ring snugly abutting one sidewall of said recess in sealing relationship, and wherein said carrier ring further includes a substantially planar annular surface opposite said second O-ring groove, said substantially planar annular surface slidably abutting the other sidewall of said recess.

4. The seal assembly defined in claim 2 further comprising a substantially cylindrical spacer element affixed to the external surface of said duct and wherein the size of said spacer element and said carrier ring are such that said first O-ring in said first groove of said carrier ring snugly encloses said spacer element of said duct, said spacer element operating to insulate said carrier ring and said O-rings from high temperatures attendant to transmission of hot gas by said duct.

5. The seal assembly defined in claim 2 wherein said housing comprises first and second annular discs, each of said discs having a substantially circular central opening sized to allow said duct to move laterally within said opening, said annular discs being aligned coaxially and spaced from one another by a tubular spacer having an inside diameter larger than the diameters of said circular openings in said discs such that said discs and said spacer form said recess containing said carrier ring, and means affixing said discs to said spacer and to said wall.

6. The seal assembly defined in claim 2, 4, or 5 wherein said first O-ring groove in said carrier ring has substantially parallel planar side walls and wherein said first O-ring has flattened sides sized to cooperably fit in said first groove to prevent rotation of said first O-ring due to axial motion of said duct.

7. The seal assembly defined in claim 6 wherein said first O-ring is formed of glass fiber reinforced silicone rubber.

8. The seal assembly defined in claim 2 wherein said recess in said housing has a depth less than the radial width of said carrier ring to thereby effectively prevent said duct from abutting said housing during vigorous lateral motion of said duct.

9. The seal assembly defined in claim 4 wherein said recess in said housing has a depth less than the radial width of said carrier ring to thereby effectively prevent said spacer element from abutting said housing during vigorous lateral motion of said duct.

10. The seal assembly defined in claim 3 further comprising a substantially tubular thermally insulating spacer element affixed about said duct, and wherein said first O-ring snugly encircles said spacer element.

11. The seal assembly defined in claims 3 or 10 wherein said carrier ring further comprises a third O-ring groove and associated third O-ring, said second and third O-ring grooves opening in opposite directions such that said second and third O-rings abut the interior facing side wall surfaces of said recess to provide a double O-ring seal between said housing means and said carrier ring.

12. The seal assembly defined in claims 3 or 10 wherein said second O-ring is formed of silicone rubber and wherein said first O-ring is formed of a glass fiber reinforced silicone rubber, said first O-ring having oppositely disposed planar surfaces oriented to lie substantially in the plane of said O-ring, and wherein said first O-ring groove of said carrier ring includes substantially planar parallel sidewalls, said first O-ring and said first O-ring groove being cooperably sized so as to prevent rotation of said first O-ring due to axial movement of said duct.

13. The seal assembly defined in claims 3 or 10 wherein said housing is formed of first and second substantially planar annular discs, said first and second discs being spaced apart by a tubular spacer having an inside diameter greater than the inside diameters of said discs such that said discs and said spacer form said recess containing said carrier ring.

14. The seal assembly defined in claim 3 wherein said recess in said housing has a depth less than the radial width of said carrier ring to thereby effectively prevent said duct from abutting said housing during vigorous lateral motion of said duct.

15. The seal assembly defined in claim 10 wherein said recess in said housing has a depth less than the radial width of said carrier ring to thereby effectively prevent said spacer element from abutting said housing during vigorous lateral motion of said duct.

* * * * *